United States Patent [19]

Troy

[11] Patent Number: 4,925,157

[45] Date of Patent: May 15, 1990

[54] SOLENOID-OPERATED CONTROL APPARATUS

[76] Inventor: Leonard Troy, 212 Glenburn Rd., Clark Summit, Pa. 18411

[21] Appl. No.: 357,364

[22] Filed: May 26, 1989

[51] Int. Cl.[5] .............................................. F16K 31/06

[52] U.S. Cl. ................................ 251/129.15; 251/143

[58] Field of Search ....................... 251/129.15, 129.01, 251/143

[56] References Cited

U.S. PATENT DOCUMENTS 3,203,447 8/1965 Bremner et al. ........... 251/129.01 X

*Primary Examiner*—Arnold Rosenthal

*Attorney, Agent, or Firm*—Joseph J. O'Keefe

[57] ABSTRACT

Solenoid-operated control apparatus wherein the solenoid coil and core are positioned to operate at an angle of 90° to the reciprocably operated plunger which controls the apparatus. Thus permitting apparatus with a lower and smaller profile than presently available apparatus of the same size and further permiting easy and convenient disassembly for maintenance purposes.

6 Claims, 2 Drawing Sheets

SOLENOID-OPERATED CONTROL APPARATUS

BACKGROUND OF THE INVENTION

This invention relates to solenoid-operated control apparatus and, more particularly, to an improved solenoid operated control valve of reduced height and size which may be utilized in confined spaces and easily maintained.

Solenoid control apparatus has been used for years for a variety of purposes, in innumerable locations and under diverse operating conditions. Solenoid control valves are particularly suited for use in hydronic, zone-controlled systems for heating and cooling homes and business establishments. Such systems utilize a closed arrangement of pipes for transferring heat, in a controlled manner, by means of a circulated fluid, almost always water, to different rooms or zones in a home or building. Such systems are equipped with a plurality of valves which respond to temperature variations within a zone or several zones either to permit the circulation or restrict the circulation of fluid to the piping in one or more such zones. While such valves function well, their size and construction present difficulties, at times, with respect to their placement in restricted areas and to their disassembly and maintenance.

In all instances known to the applicant solenoid control valves have the core of the solenoid in axial alignment with the plunger which is reciprocably operated by the solenoid. For example, U. S. Pat. No. 3,610,523 discloses a hydronic, zone-controlled temperature conditioning system which makes use of a number of solenoid control valves. The patent describes several modifications of such valves which function well, but, because of the aforementioned design and construction, are difficult to install in restricted spaces and inconvenient to disassemble and service.

SUMMARY OF THE INVENTION

The present invention addresses the disadvantages of the prior art valves. In accordance with the present invention a solenoid control valve is provided with a unique design that permits manufacture with a lower and smaller profile than presently available valves of the same size and further permits easy and convenient disassembly for maintenance purposes. In accordance with the present invention a solenoid valve is provided having the solenoid coil and core positioned to operate at an angle of 90° to the plunger which controls the valve gate. The plunger moves reciprocably within a tube extending perpendicularly to the central axis of the valve body and the inlet and outlet ports therein. This design permits the longitudinal axis of the solenoid to extend horizontally, substantially parallel to the longitudinal axis of the fluid conduits connecting with the valve, permitting a lower profile valve. The lower profile permits adjacent conduits to be positioned more closely than is the case with prior art solenoid control valves and permits easy and convenient disassembly of the valve within the confined space created by more closely positioned conduits.

BRIEF DESCRIPTION OF THE DRAWINGS

The nature of the invention will be more clearly understood by reference to the following description, the appended claims and the several views illustrated in the accompanying drawings.

DESCRIPTION OF THE PREFERRED EMBODIMENT

Figure 1:
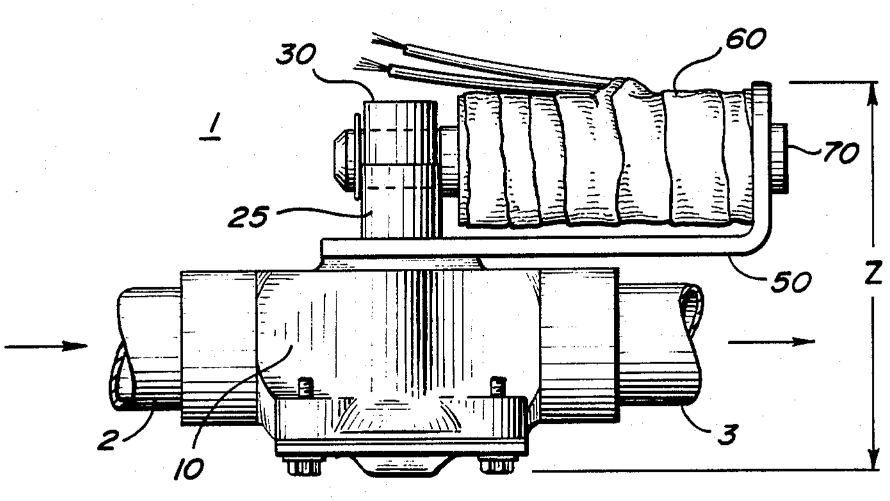
FIG. 1 is a side elevational view of an embodiment of the apparatus of this invention.
Figure 2:
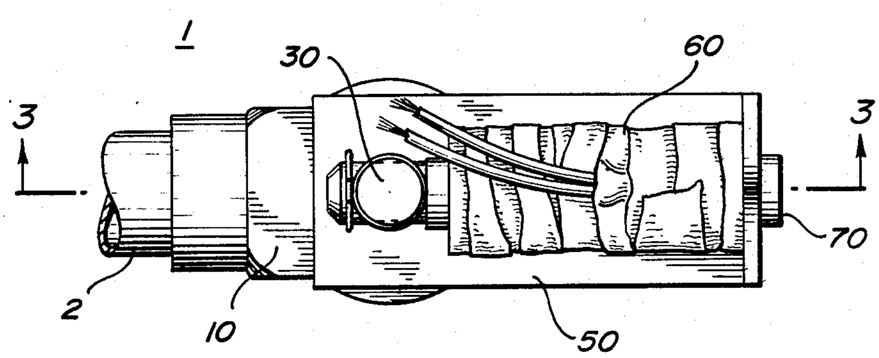
FIG. 2 is a top plan view of the valve of the embodiment of this invention shown in FIG. 1.

Referring now to the drawings and particularly to FIGS. 1 and 2, there is shown a solenoid valve 1 which is connected to a water inlet conduit 2 and outlet conduit 3 such that water flows through valve 1 in the direction indicated by the arrows. Valve 1 generally comprises valve body 10, tubular member 25, plug 30, coil L-frame member 50, coil 60, and core 70.

Figure 3:
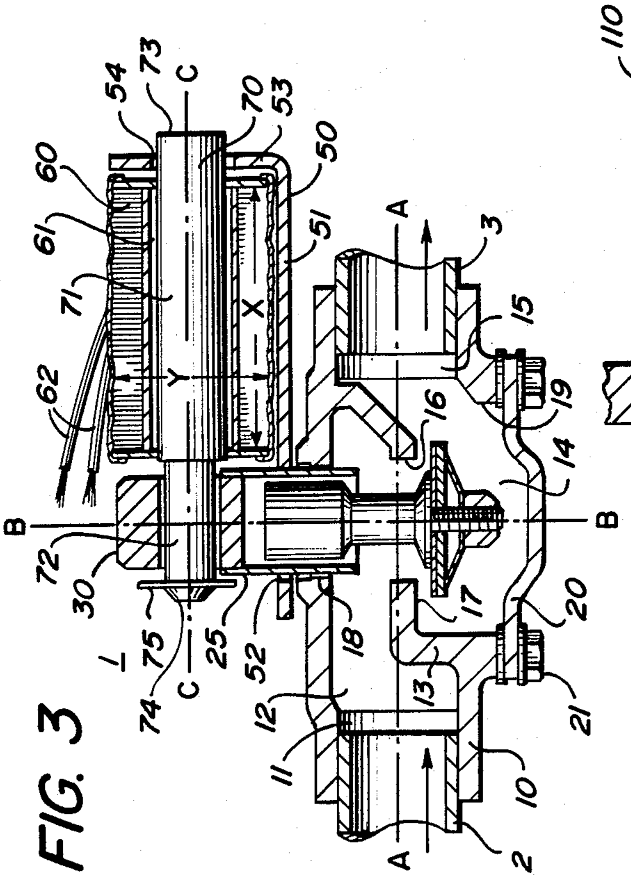
FIG. 3 is a sectional side elevational view of the valve of FIG. 2, section being taken on line 3—3 of FIG. 2.

Referring to FIG. 3, valve body 10 has inlet opening 11, inlet chamber 12, baffle 13, outlet chamber 14 and outlet opening 15. Port 16 extends through baffle 13, from inlet chamber 12 to outlet chamber 14, and seating surface 17 surrounds port 16 on the underside or outlet chamber side of baffle 13. Valve body 10 further has a top opening 18 and bottom opening 19, which is closed by cover plate 20 held in place by bolts 21.

Figure 4:
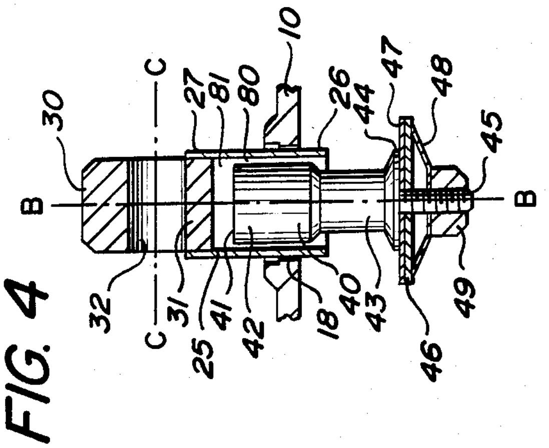
FIG. 4 is an enlarged view of a portion of FIG. 3.

As best shown in FIG. 4, tubular member 25 extends upwardly through valve top opening 18 and beyond and has an inner end 26 and outer end 27. Plug 30 fits into and seals the outer end 27 of tubular member 25 and extends outwardly therefrom. Plug 30 has an inner end 31, which extends into tubular member outer end 27, and transversely extending opening 32. Tubular member 25 is permanently attached to valve body 10 by, for example, brazing, and plug 30 is permanently attached to tubular member 25 in a similar manner.

As shown in FIGS. 3 and 4, plunger 40 extends from within tubular member 25 downwardly through valve inlet chamber 12, baffle port 16 and into outlet chamber 14. Plunger 40 has top 41, upper portion 42, which is slightly smaller in diameter than the inside diameter of tubular member 25, and lower portion 43, of smaller diameter than that of upper portion 42. Lower portion 43 has shoulder 44 and threaded end 45. Mounted on threaded end 45 is valve gate 46, having a top surface 47 that is adapted to engage seating surface 17 surrounding baffle port 16. Valve gate 46 is held against shoulder 44 by spring 48 that is secured in place by lock nut 49. Plunger 40 fits loosely within tubular member 25 forming axial passage 80 therebetween. Plunger 40 moves reciprocally within tubular member 25, and cushioning chamber 81 is formed between plunger top 41 and the adjacent inner end 31 of plug 30.

Referring to FIG. 3, valve 10 further includes L-frame member 50 having bottom portion 51 with opening 52, which is slightly larger in diameter than the outside diameter of tubular member 25, and flange 53 with flange opening 54. Cradled within frame member 50 is coil 60 which has central longitudinally extending cavity 61. Coil 60 has a length X and a diameter Y that is substantially shorter than length X. Electrical current is fed from a power source, not shown, through lead wires 62 to coil 60. Extending through coil cavity 61 is core 70 which has a central portion 71 and an outer portion 72. Core central portion 71 has an outer end 73 that extends through frame flange opening 54. Core central portion 71 has a length greater than length X of core 60 and a diameter slightly smaller than the diameter of core cavity 61. Core outer portion 72 extends through plug opening 32 and has a diameter slightly smaller than the diameter of opening 32. Adjacent outer end 74 of core outer portion 72 is fastener 75 which fits within a groove, not shown, and prevents core 70 from being dislodged from position.

As shown in FIG. 3, the longitudinal axis A-A of valve 1 coincides with the central axes of conduits 2 and 3, which connect with inlet and outlet openings 11 and 15 respectively. The central axes of tubular member 25, plug 30 and plunger 40 are coincidental and are identified by center line B—B which is perpendicular to valve axis A—A. The longitudinal axes of coil cavity 61 and core 70 and the center axis of plug opening 32 are coincidental and identified by line C—C, which is perpendicular to center axis B—B of tubular member 25, plug 30 and plunger 40. Axes A—A, B—B and C—C lie in the same plane.

The valve of this invention operates in a manner similar to known solenoid operated valves. The arrows in FIGS. 1 and 3 indicate the direction of the flow of water through conduit 2, valve body 10 and conduit 3. When there is no current passing through lead wires 62 to coil 60, the flow of water through inlet chamber 12 to port 16 and against the top 47 of valve gate 46 normally urges plunger 40 downwardly in tubular member 25 and moves valve gate 46 away from seating surface 17. This permits water to flow through port 16, around valve gate 46 into outlet chamber 14 and from valve body 10 through outlet conduit 3.

No wiring diagram is included with the Figures and only a brief explanation of the electric circuit will be made as the wiring and electrical circuit for solenoid control valves is well known to those skilled in the art. The electrical current used may be alternating or direct; however, direct current is preferred. Plug 30, plunger 40, frame member 50 and core 70 are made of material having magnetic characteristics, such as steel, while tubular member 25 is made of non-magnetic material, such as brass. Typically, a thermostat, not shown, is used to switch electrical current through lead wires 62 into coil 60 when the temperature in a room or zone changes enough to initiate action of the thermostat. The flow of electricity through coil 60 induces a magnetic field and magnetizes core 70, frame member 50, and plug 30. Magnetized core 70, frame member 50 and plug 30 attract plunger 40 causing it to move upwardly in tubular member 25. The upward movement of plunger 40 brings the top 47 of valve gate 46 into contact with seating surface 17 on the underside of baffle 13, closing port 16, thereby shutting off the flow of water through valve 10.

Solenoid operated valve 1 of this invention is usually disassembled by removing bolts 21 and cover plate 20, which permits the easily withdrawal of plunger 40 and associated parts. Coil 60 and core 70 can be removed from valve 1 simply by withdrawing core fastener 75 from its locking position. Core 70 can then be moved horizontally to the right through coil cavity 61 and frame member opening 54. The parts can be readily replaced in the reverse manner.

Figure 5:
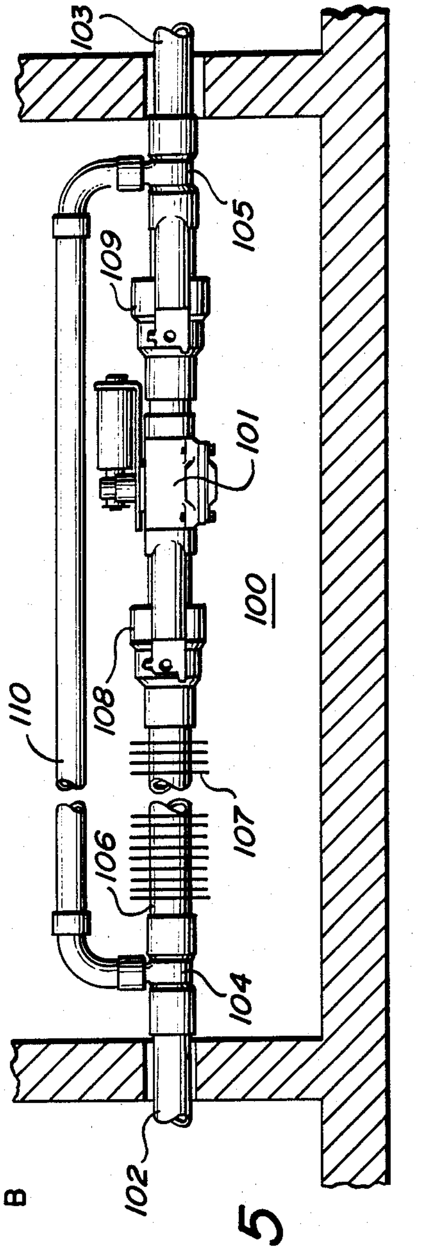
FIG. 5 is a view illustrating the manner in which the valve of the embodiment of this invention is connected to a portion of a hydronic system.

In FIG. 5 there is illustrated one manner in which a valve of this invention may be used. There is shown a radiator system 100 which comprises solenoid-operated valve 101, inlet conduit 102, outlet conduit 103, T-fittings 104 and 105, radiation line 106, which has fins 107, ball valves 108 and 109 and bypass conduit 110, which connects with T-fittings 104 and 105, all connected as shown. By virtue of the low profile of valve 101 of this invention and its unique construction which permits easy disassembly by movement of core 70 sideways as described above, rather than upwardly as required in the prior art solenoid-operated valves, bypass conduit 110 can be connected more closely to radiator line 106 and valve 101 than was previously possible. This permits a compact installation in a modern baseboard radiation system where, from a design viewpoint, compactness is a necessity when competing with alternate heating systems.

By virtue of the unique solenoid control valve construction of this invention, i.e. with coil 60 and core 70 at right angles to plunger 40, the overall height Z of valve 1, as shown in FIG. 1, is less than that of prior art valves of similar conduit size. For example, a ¾" diameter valve manufactured by the Automag Co. of Jessup, Pa., in accordance with the construction of this invention, has an overall height Z of about 2¾" and can be disassembled without the requirement for any additional vertical clearance. A ¾" diameter valve of the prior art construction, i.e. with the core and plunger in line, also manufactured by the Automag Co., has an overall height of 3-½" and an additional 1-¾" vertical clearance is required for disassembly.

The apparatus of this invention and its method of operation have been described above in a preferred manner. It is recognized that modifications and variations can be made by those skilled in the art to the above described apparatus without departing from the spirit and scope thereof as defined in the appended claims. For example, valve gate 46 may be constructed as a sliding gate in a modified housing. From a broader viewpoint, although plunger 40 is described as a gate associated with a valve housing, the plunger may be associated with comparable devices or mechanisms in a housing of other apparatus.

I claim:

1. Solenoid-operated apparatus comprising:

(A) a body including:
  (i) a baffle having a port therein,
  (ii) inlet and outlet openings in axial alignment with the longitudinal axis of said body;
(B) coil means having a longitudinally extending cavity with a central axis substantially parallel to the longitudinal axis of said body;
(C) core means extending at least partially through the cavity of said coil means;
(D) plunger means having a longitudinally extending axis substantially perpendicular to the central axis of said coil means cavity and the longitudinal axis of said body; and
(E) gate means within said body and connected with said plunger means for movement therewith for opening and closing the port of said body.

2. Solenoid-operated apparatus comprising:

(A) a body including:
  (i) a baffle having a port therein,
  (ii) inlet and outlet openings in axial alignment with the longitudinal axis of said body;
(B) coil means having a longitudinally extending cavity with a central axis substantially parallel to the longitudinal axis of said body;
(C) core means extending within the cavity of said coil means and having a first end extending beyond said coil cavity;

(D) plug means mounted adjacent said coil and having:
(i) a central axis substantially perpendicular to the central axis of said coil cavity,
(ii) a transversely extending opening for receiving the first end of the core of said coil, and
(iii) an inner end;
(E) plunger means spaced from the inner end of said plug means, and having a longitudinal axis substantially in alignment with the central axis of said plug means; and
(F) gate means within said body and connected with said plunger means for movement therewith for opening and closing said body port.

3. A valve for controlling the flow of fluid through conduits connected therewith comprising:
(A) a valve body including:
(i) a top opening, and
(ii) a baffle having a port therein;
(B) a hollow member extending upwardly from the top opening of said valve body and having an outer end;
(C) plug means, having therein a transverse opening with a central axis, sealing the outer end of said hollow member and extending upwardly therefrom;
(D) plunger means, having a longitudinal axis substantially perpendicular to the central axis of transverse opening of said plug, extending within said hollow member and through the top opening of said valve body;
(E) gate means connected with said plunger means for reciprocal movement therewith to open and close the port of said valve body;
(F) coil means mounted adjacent said plug and including:
(i) a longitudinally extending cavity having a central axis in alignment with the central axis of the transverse opening of said plug means; and
(G) core means extending through said coil cavity and having an outer portion extending within the opening of said plug means.

4. A valve for controlling the flow of fluid through conduits connected therewith, comprising:
(A) a valve body having:
(i) first end opening, having a central axis, for connection with a first conduit;

(ii) second opening, having a central axis in alignment with the central axis of the first opening, for connection with a second conduit;
(iii) top opening having an axis substantially perpendicular to the axes of the first and second openings of said valve body; and
(iv) baffle having:
(i) a port, and
(ii) a seating surface surrounding the port;
(B) hollow member, having a longitudinal axis substantially perpendicular to the central axes of the first and second openings of said valve body, extending upwardly from the top opening of said valve body;
(C) plug means sealing the outer end of said hollow member and having:
(i) a transverse opening having a central axis substantially perpendicular to the longitudinal axis of said hollow member;
(D) plunger means having:
(i) a longitudinal axis in alignment with the longitudinal axis of said hollow member,
(ii) first end portion extending within said hollow member; and
(iii) second end portion extending through the top opening of said valve body;
(E) gate means connected with the second end portion of said plunger means for engaging the seating surface of the baffle port of said valve body; .
(F) coil means, mounted adjacent said plug means and having:
(i) a longitudinally extending cavity therein;
(G) core means extending through the cavity of said coil means and having:
(a) first end portion, and
(b) second end portion extending through the opening of said plug means.

5. The valve of claim 4 further including:
(A) frame means for support of said coil means and comprising:
(i) a flange portion having:
(a) an opening therein for receiving the first end portion of said core means, and
(ii) a bottom portion having:
(a) an opening therein for mounting said frame on said hollow member.

6. The valve of claim 1 further including L-shaped frame means for supporting one end of said core means and extending parallel therewith.

* * * * *

UNITED STATES PATENT AND TRADEMARK OFFICE
CERTIFICATE OF CORRECTION

PATENT NO. : 4,925,157

DATED : May 15, 1990

INVENTOR(S) : Leonard Troy

It is certified that error appears in the above-identified patent and that said Letters Patent is hereby corrected as shown below:

Column 4, line 26, "1-3/4" vertical" should read --1-5/8" vertical--.

Signed and Sealed this

Sixth Day of August, 1991

*Attest:*

HARRY F. MANBECK, JR.

*Attesting Officer*

*Commissioner of Patents and Trademarks*